(12) United States Patent
Manahan et al.

(10) Patent No.: US 10,680,431 B2
(45) Date of Patent: Jun. 9, 2020

(54) REPLACEABLE ELECTRICAL PROTECTION SYSTEM FOR EQUIPMENT UNDER LOAD

(71) Applicant: Eaton Intelligent Power Limited, Dublin (IE)

(72) Inventors: Joseph Michael Manahan, Manlius, NY (US); Benjamin Avery Freer, Syracuse, NY (US)

(73) Assignee: Eaton Intelligent Power Limited (IE)

( * ) Notice: Subject to any disclaimer, the term of this patent is extended or adjusted under 35 U.S.C. 154(b) by 281 days.

(21) Appl. No.: 15/693,784

(22) Filed: Sep. 1, 2017

(65) Prior Publication Data

US 2018/0069392 A1    Mar. 8, 2018

Related U.S. Application Data

(60) Provisional application No. 62/382,974, filed on Sep. 2, 2016.

(51) Int. Cl.
*H02H 3/38* (2006.01)
*H01H 9/22* (2006.01)
(Continued)

(52) U.S. Cl.
CPC ............ *H02H 3/38* (2013.01); *H01H 9/22* (2013.01); *H01H 9/54* (2013.01); *H01H 71/025* (2013.01);
(Continued)

(58) Field of Classification Search
CPC .. H01H 71/126; H01H 71/08; H01H 71/0264; H01H 3/38; H01H 9/54
See application file for complete search history.

(56) References Cited

U.S. PATENT DOCUMENTS 4,691,180 A * 9/1987 Grunert ................. H01H 71/68
335/13
4,829,278 A * 5/1989 Livesey ............... H01H 71/126
200/51.09
(Continued)

FOREIGN PATENT DOCUMENTS

KR    10-2015-0052646 A    5/2015
WO       2014/016604 A1    1/2014

OTHER PUBLICATIONS

International Search Report and Written Opinion for Application No. PCT/US2017/049741 dated Dec. 15, 2017.
(Continued)

*Primary Examiner* — Scott Bauer
(74) *Attorney, Agent, or Firm* — Merchant & Gould P.C.

(57) ABSTRACT

The present disclosure relates to an electrical protection system , including a breaker enclosure and associated terminals, and the methods of use therefor that allow for a circuit breaker or other electrical protection device to be safely added or removed from a circuit while power is supplied to at least one of the terminals. The disclosed enclosure and terminals include a series of interrelated safety features that prevent a user from accidentally completing the circuit from one terminal to another when the electrical protection system would be in an unsafe state. The combination of features described herein allow for a replaceable electrical protection device for equipment under load to be realized, thus improving user safety.

27 Claims, 10 Drawing Sheets

(51) Int. Cl.
*H01H 71/08* (2006.01)
*H01H 71/12* (2006.01)
*H01H 71/02* (2006.01)
*H01H 9/54* (2006.01)
*H01H 71/24* (2006.01)
*H02H 1/00* (2006.01)

(52) U.S. Cl.
CPC .......... *H01H 71/08* (2013.01); *H01H 71/126* (2013.01); *H01H 71/2445* (2013.01); *H02H 1/0061* (2013.01)

(56) References Cited

U.S. PATENT DOCUMENTS

| | | | |
|---|---|---|---|
| 5,381,119 A * | 1/1995 | Robbins | H01H 71/126 |
| | | | 200/309 |
| 5,831,503 A * | 11/1998 | Beck | H01H 71/10 |
| | | | 335/172 |
| 9,431,184 B2 | 8/2016 | Lee et al. | |
| 9,564,280 B2 * | 2/2017 | Mittlestadt | H01H 71/126 |
| 9,564,741 B1 * | 2/2017 | Mittelstadt | H01H 71/08 |
| 2003/0048160 A1 | 3/2003 | Alfaro et al. | |
| 2007/0121268 A1 | 3/2007 | Terhorst | |
| 2009/0255787 A1 | 10/2009 | Rane et al. | |
| 2011/0102953 A1 | 5/2011 | Bonilla et al. | |

OTHER PUBLICATIONS

Extended European Search Report for Application No. 17847591.9 dated Feb. 26, 2020.

\* cited by examiner

REPLACEABLE ELECTRICAL PROTECTION SYSTEM FOR EQUIPMENT UNDER LOAD

CROSS REFERENCE TO RELATED APPLICATION

This application claims the benefit of U.S. Provisional Application No. 62,382,974, filed Sep. 2, 2016, and titled "Replaceable Electrical Protection System for Equipment Under Load," the disclosure of which is hereby incorporated herein by reference.

TECHNICAL FIELD

The present technology is related generally to electrical protection devices, such as circuit breakers, contactors, starters, switches, fuse blocks, etc., and the safer construction, installation, and usage thereof.

BACKGROUND

A circuit breaker is an electrical device used in circuits to protect the components downstream from the circuit breaker from overloading due to excessive voltage or amperage. When an overload condition is detected, the circuit breaker will trip, causing the circuit to open at the breaker and for the downstream components to be cut off from the flow of electricity from upstream. Circuit breakers can also be used as switches, where a user manually opens or closes the breaker so that equipment downstream from the breaker may be safely inspected, replaced, or added to the circuit. To safely inspect, replace, or add a circuit breaker or other electrical protection device to a circuit, however, the circuit will typically be de-energized (e.g., the electrical current is turned off or cut off from upstream and downstream power sources, and capacitors are given time to discharge), such that the electrical protection device is not under load.

SUMMARY

The present disclosure provides details for an improved electrical protection device system (and methods for the use thereof) that may be safely added to or removed from a circuit while that circuit is under load. By using a series of interlocks, detents, and poka-yokes, the improved system allows for a user to remove and/or install the protection device into the circuit with greater safety than prior protection devices and without needing to ensure that all power sources (upstream or downstream) leading to the terminals have been cut off.

Aspects of the present disclosure relate to cost-effective methods, devices and systems for making circuit breakers, switches, contactors, starters, fuse blocks, and other electrical protection devices more reliable and safe, while improving the ability for those devices to be inspected, removed, or installed. Certain examples of the present disclosure relate to a single phase circuit breaker, but the present disclosure is equally applicable to multiphase circuit breakers and other electrical protection devices.

A variety of additional inventive aspects will be set in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
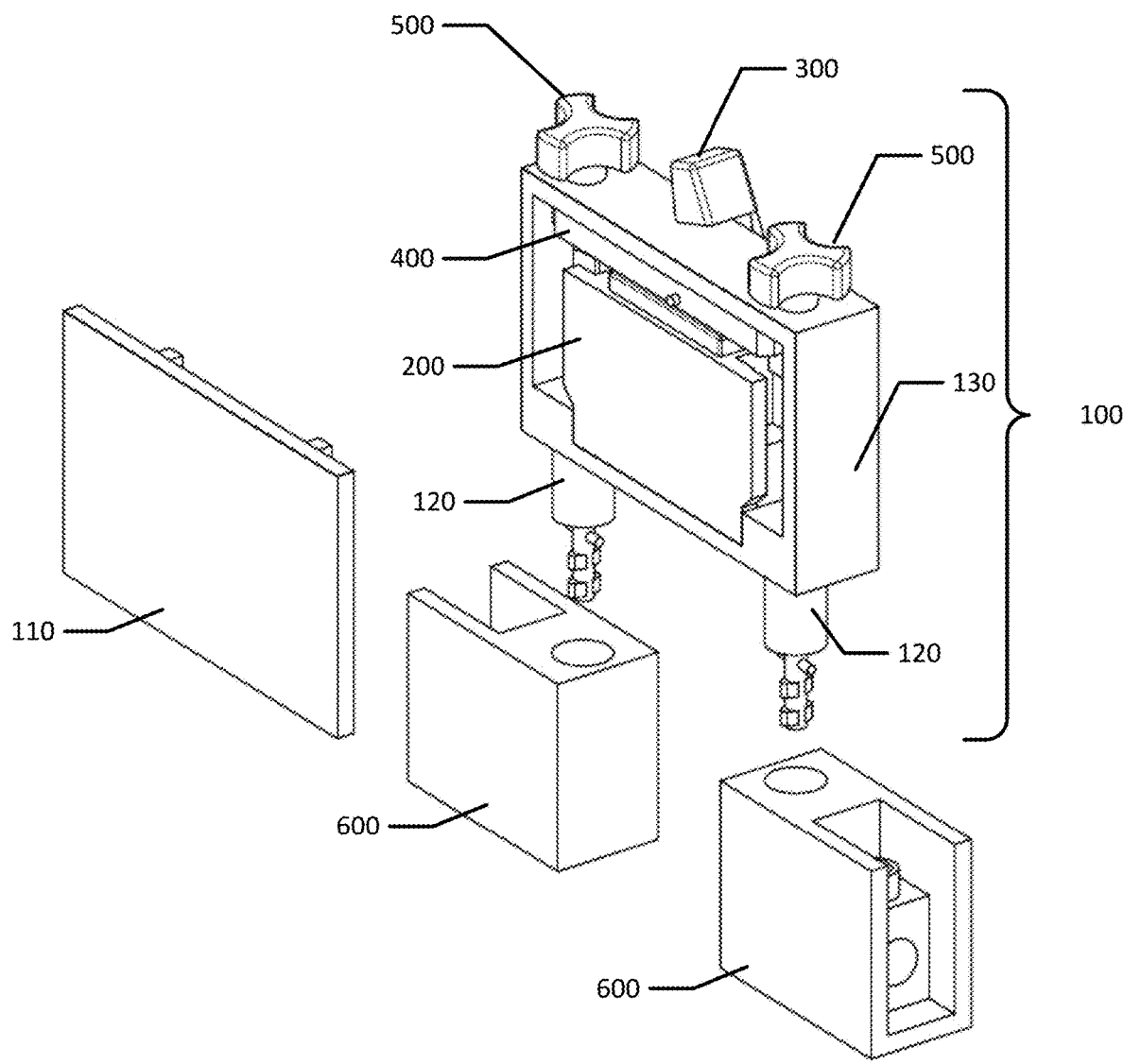
FIG. 1 is a cut-away view of an installed circuit breaker in the open state.

Various examples will be described in detail with reference to the drawings, wherein like reference numerals represent like parts and assemblies throughout the several views. Any examples set forth in this disclosure are not intended to be limiting and merely set forth some of the many possible ways for implementing the broad inventive aspects disclosed herein.

The present disclosure relates to an electrical protection device system with multiple interdependent safety features (e.g., keying features, mechanical locks, mechanical interlock, mechanical blocks, etc.) that cooperate to require assembly and disassembly of the electrical protection device system in a particular sequence. A first set of safety features relates to the mechanical interface between rotatable contacts and their corresponding electrical terminals. A second set of safety features relates to the mechanical interface between the rotatable contacts and a trip unit that opens and closes an electrical connection between the rotatable contacts. The rotatable contacts can only be inserted into the system when in a first rotational state. The trip unit blocks insertion of the rotatable contacts into the system when closed and allows insertion of the rotatable contacts into the system when open. When the trip unit is open, the rotatable contacts can be inserted into the system while in the first rotational state. As so inserted, the rotatable contacts do not electrically connect to their corresponding terminals and also block the trip unit from being closed. The inserted contacts can be electrically connected to their corresponding terminals by rotating the contacts from the first rotational states to second rotational states. In one example, the first and second rotational states are offset 90 degrees from one another. When the contacts are inserted in the system and rotated to the second rotational state, the contacts are prevented from being removed from the system and allow the trip unit to be closed. The contacts can only be removed from the system when in the first rotational state. The trip unit prevents the loaded contacts from being moved from the second rotational state to the first rotational state when the trip unit is closed and allows the loaded circuit to be moved from the second rotational state to the first rotational state when the trip unit is open.

Figure 2:
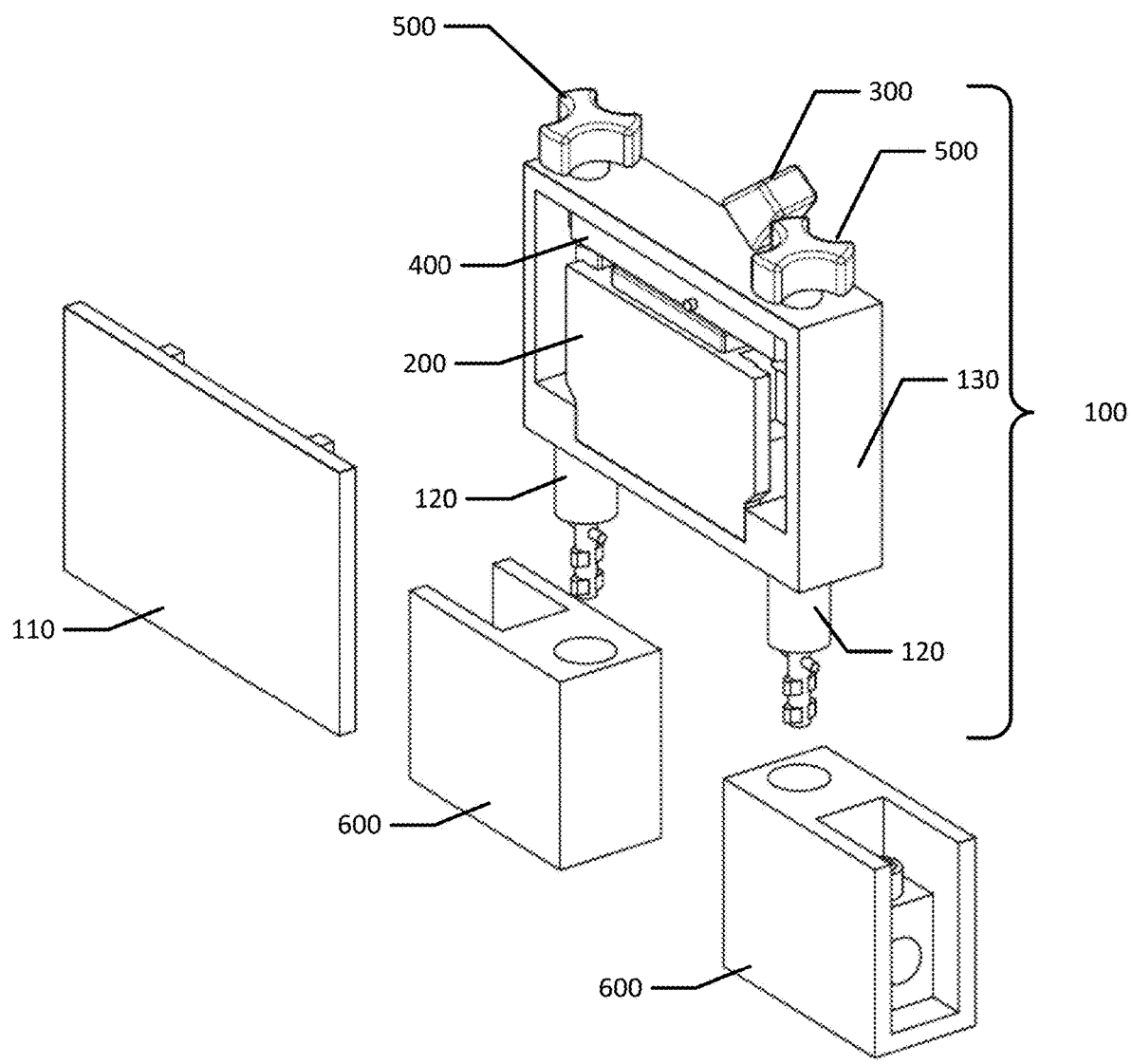
FIG. 2 is a cut-away view of an installed circuit breaker in the closed state.

FIG. 1 is a cut-away view of an installed circuit breaker system (as an example electrical protection device system) in the open state and FIG. 2 is a cut-away view of the installed circuit breaker system in the closed state. As illustrated, the circuit breaker system is installed by attaching a breaker enclosure 100 via contact assemblies 500 (individually, first contact assembly 500a and second contact assembly 500b) to terminals 600 (individually, first terminal 600a and second terminal 600b). Although shown as a single-phase breaker, in alternative aspects the circuit breaker system may be a multi-phase breaker with additional pairs of contacts assemblies 500 and associated pairs of terminals 600 for each phase. In yet other aspects, the electrical protection device may be a device other than a circuit breaker, such as, for example, a switch, contactor, or a starter. One of ordinary skill in the art will be able to use the example of the single phase circuit breaker and apply the present disclosure to the use of other electrical protection devices.

In various aspects, the breaker enclosure 100 may include a cover 110 that may be selectively removed and reattached to an enclosure body 130 allow a user to install or replace a trip unit 200 or other internal feature of the circuit breaker. As will be appreciated, various markings may be made on or in the breaker enclosure 100 that indicate the load rating for which the circuit breaker is intended, manufacturer's information, installation instructions, safety information, and the like.

The breaker enclosure 100 may also include one or more cowls 120 that extend along a portion of the length of the contact assemblies 500 to protect and to guide the contact assemblies 500 during insertion or removal from the terminals 600. In various aspects, the cowls 120 may be a fixed length less than the exposed length of the contact assemblies 500, while in other aspects, the cowls 120 may extend along the entire length (or past the length) of the contact assemblies 500 exposed from the enclosure body 130 when the breaker enclosure 100 is not installed in the terminals 600, but partially retract into the enclosure body 130 during installation in the terminals 600.

In various aspects, the cowls 120 may fully wrap around the contact assemblies 500 or may act as a guide that does not completely wrap around an associated contact assembly 500. Although the illustrated cowls 120 are shown as circular, other shapes are possible (e.g., ovoid, triangular, rectangular, pentagonal, etc.). Additionally, the cowls 120 may act as a poka-yoke to prevent a user from attempting to install the breaker enclosure 100 into terminal 600 that lacks safety features designed to work with the circuit breaker system described herein or at an improper orientation into a terminal 600. The cowl 120 may act as a poka-yoke either due to its cross section being too large to allow for insertion of the breaker enclosure 100 into the terminal 600, or its height being too great to allow for the contact assembly 500 to make electrical contact in the terminal 600. In various aspects, the installed length of the cowl 120 may be sized so that an air gap is defined between the bottom of the contact assembly 500 and the terminal 600. The cowl 120 also serves as a flame-path to prevent combustion due to arcing in the terminal 600 and/or the presence of combustible gas in a hazardous environment.

The breaker enclosure 100 houses a trip unit 200 in the enclosure body 130 that is operable to detect an overload condition and automatically move the circuit breaker system from the closed state to the open state. The trip unit 200 may be actuated by an actuator lever 300 to move the circuit breaker system from opened to closed states and vice versa. The actuator lever 300 actuates an interlock toggle 400 to interfere with or allow the rotation of the contact assemblies 500 depending on the state of the trip unit 200. The breaker enclosure 100, actuator lever 300, and interlock toggle 400 are preferably constructed from a heat-resistant, non-conductive material.

In various aspects, the trip unit 200 may be magnetically, thermally, thermo-magnetically signaled to an overload condition in the circuit to which the circuit breaker system is attached. Different trip units 200 may be rated for different loads (e.g., the amounts of current, voltage, or associated magnetic flux or thermal buildup designated as an overload condition) and one of ordinary skill in the art will know how to select a trip unit 200 appropriate for the intended load. The trip unit 200 may contain internal contacts or an assembly to move external contacts located in the breaker enclosure 100, wherein the contacts move in and out of electrical communication and thereby close and open the circuit in response to the overload condition being detected or a user manually actuating the circuit breaker system by the actuator lever 300. In various aspects, the trip unit 200 may contain calibrators (e.g., set screws), overload condition adjustors, and arc suppressors.

When the trip unit 200 moves between the open state illustrated in FIG. 1 and the closed state illustrated in FIG. 2, the actuator lever 300 also moves. The actuator lever 300 moves in an arc between at least two stable positions corresponding to the open and closed state of the circuit breaker system. In some aspects, additional stable positions may be possible for the actuator lever 300 to indicate additional information to a user (e.g., open-manual, open-tripped, open-ground fault, closed). The actuator lever 300 is in physical contact with the trip unit 200 and the interlock toggle 400, and will move in response to the trip unit 200 tripping the circuit breaker system or an outside force (e.g., a user) opening or closing the circuit breaker system to set the state of the trip unit 200. In various aspects, the actuator lever 300 may be a separate component connected to a state switch of the trip unit 200 or may be the state switch (or extension thereof) that protrudes from the enclosure body 300.

The interlock toggle 400 moves (primarily) laterally across the length of the trip unit 200 to interfere with the rotation of the contact assemblies 500 when the trip unit 200 is in the closed state; preventing the contact assemblies 500 from rotating when the circuit breaker system could carry current (i.e., when the trip unit 200 is in a closed state). Stated differently, when the trip unit 200 is in the closed state, the interlock toggle 400 is positioned such that the contact assemblies 500 are locked to remain rotated in their conductible state (i.e., the state in which the contact assemblies 500 may be installed to conduct current when the trip unit 200 is closed) so that the contact assemblies 500 cannot be removed from the terminals 600 until the trip unit 200 enters the open state and disengages the interlock toggle 400 to allow for the contact assemblies 500 to be rotated to the insertion state to enable a user to insert or remove the contact assemblies 500 from the terminals 600 safely.

The interlock toggle 400 includes an interlock body 420 with two arms 440 on either end of the interlock body 420 to engage with the interlock tabs 540 defined on the contact assemblies 500 (discussed in greater detail in regard to FIG. 3) when the trip unit 200 is in the closed state. The arms 440 protrude from the interlock body 420 in a different plane from the primary plane of the interlock body 420 and its travel so that the interlock body 420 does not engage with the contact assembly 500. In various aspects, the length of the body 420 is such that when the trip unit 200 is in the open state the arms 440 are moved out of physical contact (or potential contact) with the contact assemblies 500, thus allowing the free rotation of the contact assemblies 500 between the installation and insertion states. In various aspects, the interlock toggle 400 may be part of the trip unit 200 or actuator lever 300 or may be a separate component connected to the trip unit 200 or actuator lever 300 (e.g., via slots and tabs) that moves when the state of the breaker changes. The states of the trip unit 200 and resultant position of the interlock toggle 400 and the states of the contact assemblies 500 are discussed in greater detail in regard to FIG. 8.

Figure 3:
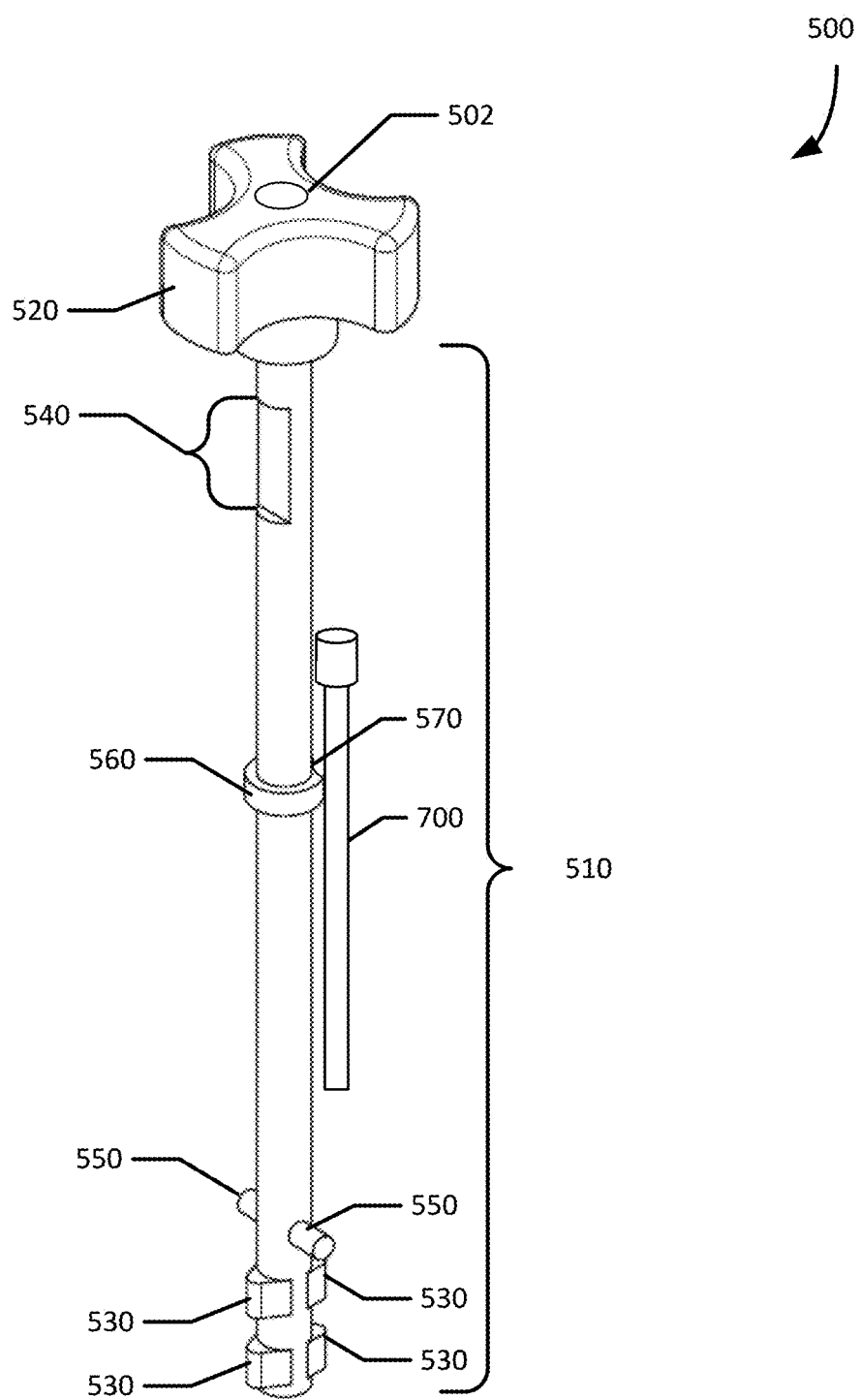
FIG. 3 is an orthographic view of the contact assembly for the circuit breaker.

In various aspects, a detent 700, an example of which is shown in relation to FIG. 3, is associated with each contact assembly 500. The detent 700 prevents the over rotation of the contact assembly 500, such that the contact assembly 500 may rotate between the installation and insertion states, but not beyond, even when the contact assembly 500 is not engaged with the toggle interlock 400. In various aspects, the detent 700 may engage with one or more features on the breaker enclosure 100, the trip unit 200, or the terminal 600 and one or more features on the contact assembly 500 to prevent over rotation. The detent 700 may be a separate component in communication with the contact assembly that rotates with the contact assembly 500 as it rotates, and makes contact with the breaker enclosure 100, the trip unit 200, or the terminal 600 when full rotation is achieved or may be an extension of the contact assembly 500 that prevents rotation of the assembly by engaging with another component once full rotation is achieved; several varieties of detents 700 are possible.

In aspects where the circuit breaker system is designed for protecting more than one phase (which may include a ground phase) the internal components of the breaker enclosure 100 may be designed to handle multiple phases, or individual components designed for one phase may be multiplied within the breaker enclosure 100. For example, when the circuit breaker system is designed for protecting one phase, one trip unit 200, one interlock toggle 400, and two contact assemblies 500 may be enclosed by the breaker enclosure 100. In another example, when the circuit breaker system is designed for protecting two phases, two single-phase trip units 200, two interlock toggles 400, and four contact assemblies 500 may be enclosed by the breaker enclosure 100 or one two-phase trip unit 200, one or two interlock toggles 400, and four contact assemblies 500 may be enclosed by the breaker enclosure 100. In aspects where more than two contact assemblies 500 are present, contact assemblies 500 on a given side of the trip unit 200 (e.g., anode or cathode) may share a knob 520 and may be mechanically communicated to the knob 520 (via interlocking gears, sprocket and chain, three bar linkage, etc.) so that an operator may rotate a single knob 520 to rotate multiple contact assemblies 500.

FIG. 3 is an orthographic view of a contact assembly 500 showing various details and sub-components. The contact assembly 500, when installed in the circuit breaker system, is in electrical communication with the trip unit 200 so that current may flow from a first terminal 600a, through a first contact assembly 500a, through the contacts (if closed), through a second contact assembly 500b, and to a second terminal 600b. The contact assembly 500 is partially housed within the breaker enclosure 100, but protrudes so that when the circuit breaker system is fully installed into the terminals 600, the contact assembly 500 will be installed into the contact cavity 640 of the terminal 600 (shown in greater detail in regard to FIGS. 4, 5, and 6).

The contact assembly 500 comprises a shaft 510 that is electrically conductive, but various portions of the contact assembly 500 may not be electrically conductive. For example, a knob 520 disposed of at the end of the contact assembly 500, by which a user may rotate the contact assembly 500, may be made of an electrically non-conductive material, and the shaft 510 may be clad (at least partially) with an electrically non-conductive material for greater safety during installation/removal while under load.

The shaft 510 is electrically communicated to the terminals 600 when installed via contact leads 530. A contact lead 530 may be a protrusion from the shaft 510 (such that the shaft 510 and one or more contact leads 530 are milled from a single piece) or may be a separate component connected to the shaft 510. For example, the contact leads 530 may be connected via wiring and springs (i.e., are spring-loaded) to ensure solid electrical contact between the shaft 510 and the terminal 600. In another example, the contact leads 530 may be brazed or welded to the shaft 510. The contact leads 530 are made of a conductive material and may be coated with another conductive material (e.g., electroplated) for preventing corrosion, reducing wear, or lowering surface electrical resistance. For example, a copper contact lead 530 may be plated with gold or a higher grade of copper along its contact surfaces.

The shaft 510 defines a depression, referred to as an interlock tab 540, on the contact assembly 500 that enables the free movement of the interlock toggle 400 when the contact assembly 500 is rotated to not make electrical contact with the terminals 600 and to disable the interlock toggle 400 from moving freely when the contact assembly 500 is rotated to make electrical contact with the terminals 600. When all of the contact assemblies 500 are rotated to make contact with the terminals 600, the interlock toggle 400 can freely move and the state of the circuit breaker 500 may change (e.g., a user may open or close the circuit breaker system). When at least one of the contact assemblies 500 are rotated to not make contact with the terminals 600, the depression defining the interlock tab 540 rotates to block the free motion of the interlock toggle 400, which in turn prevents the trip unit 200 (via the actuator 300) from opening or closing the contacts. In various aspects, the interconnect toggle 400 may be connected to one or more interlock tabs 540 via a hinge or joint to push the trip unit 200 into an open state when the associated contact assembly 500 is rotated to allow for insertion into the terminal 600. The states of the trip unit 200 and resultant position of the interlock toggle 400 and the states of the contact assemblies 500 are discussed in greater detail in regard to FIG. 8.

To prevent the user from inserting the contact assemblies 500 into the terminals 600 when the contact assemblies 500 can make electrical contact or removing the contact assemblies 500 from the terminals 600 while they are in electrical contact with the terminals 600, the contact assemblies 500 include insertion tabs 550. The insertion tabs 550 interact with the installation collar 650 of the terminals 600 (shown in greater detail in regard to FIGS. 4 and 5) to prevent electrical contact being established or broken via the contact assembly 500 being inserted or removed from the terminals 600. The gap defined by installation collar 650 is wide enough for the free travel of the contact leads 530 throughout the area defined by the installation collar 650, but only wide enough to allow the insertion of the insertion tabs 550 past the installation collar 650 when the contact assembly 500 is in a single orientation. The insertion orientation is such that the interlock tab 540 would prevent the free movement of the interlock toggle 400 so that the trip unit 400 cannot have its state changed while the contact assemblies 500 can be inserted into the terminals 600.

The contact assembly 500 as illustrated include a collar 560, protruding with a greater diameter than the shaft 510. In various aspects, the collar 560 is oblong and acts as a detent 700 that engages with breaker enclosure 100 or the trip unit 200 when the contact assembly 500 has been fully rotated. In other aspects, the collar 560 may be circular but defines a capture 570 that engages with a detent 700 that is a separate component that engages with the contact assembly 500 and the breaker enclosure 100, the trip unit 200, or a feature in the terminal 600 to prevent over-rotation. In various aspects, the detent 700 may be spring-loaded, such that it engages with the capture 570 to interfere with the rotation to the contact assembly 500 when the breaker enclosure 100 is not installed into the terminals 600, but is pushed out of engagement with the capture 570 when the breaker enclosure 100 is installed into the terminals 600 (e.g., via contact with the installation collar 650); allowing the rotation of the contact assemblies 500 only when installed into the terminals 600.

In some examples, the contact assembly 500 may include one or more status indicators 502. The status indicator 502 provides local communication of the status of contact assembly. For example, the status indicator 502 could include one or more LED lights, such as red and green LEDs that visually indicate successful or unsuccessful installation of the contact assembly 500 into the terminal 600.

Figure 4:
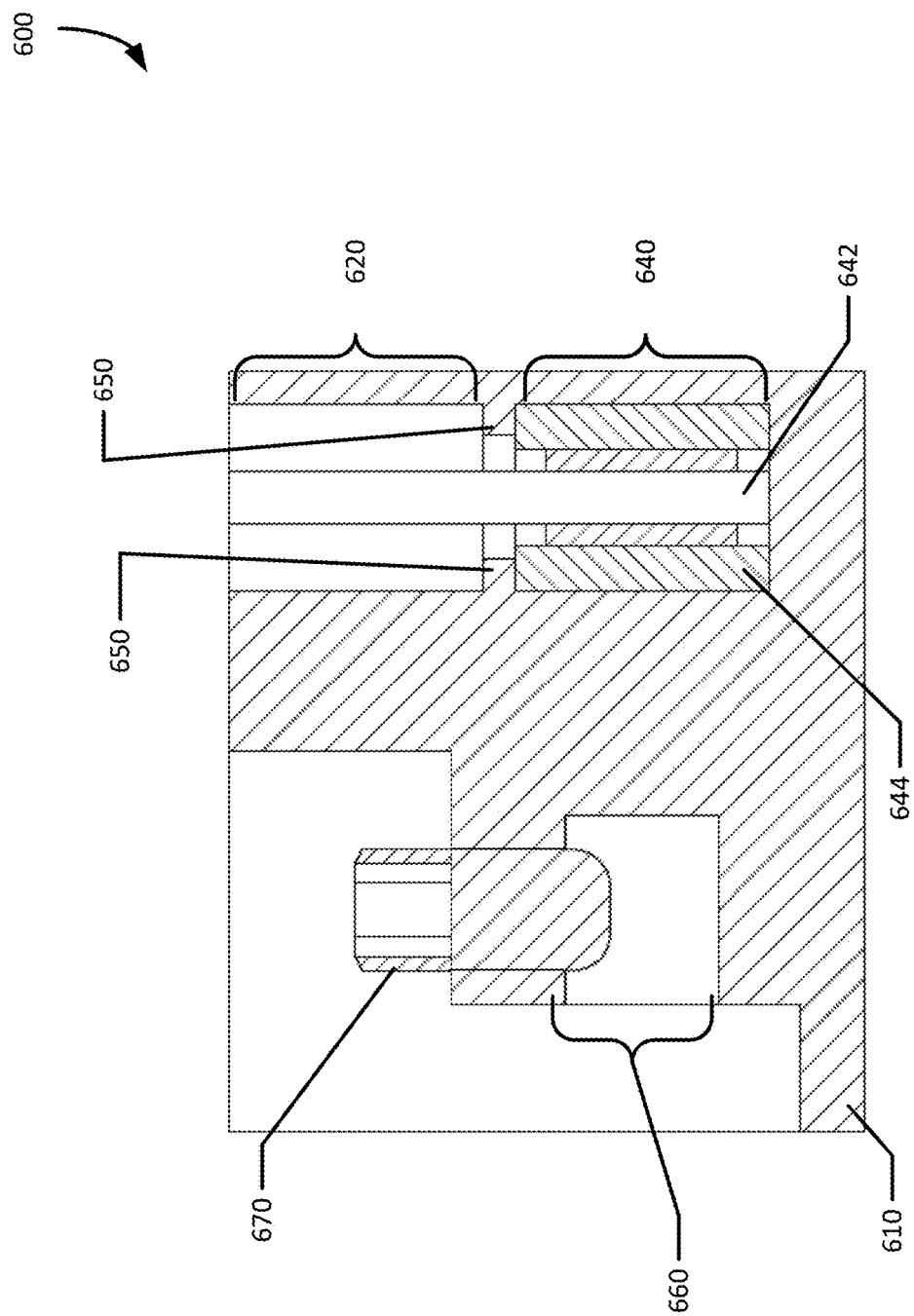
FIG. 4 is an orthographic cut-away view of the terminal for the circuit breaker.
Figure 5:
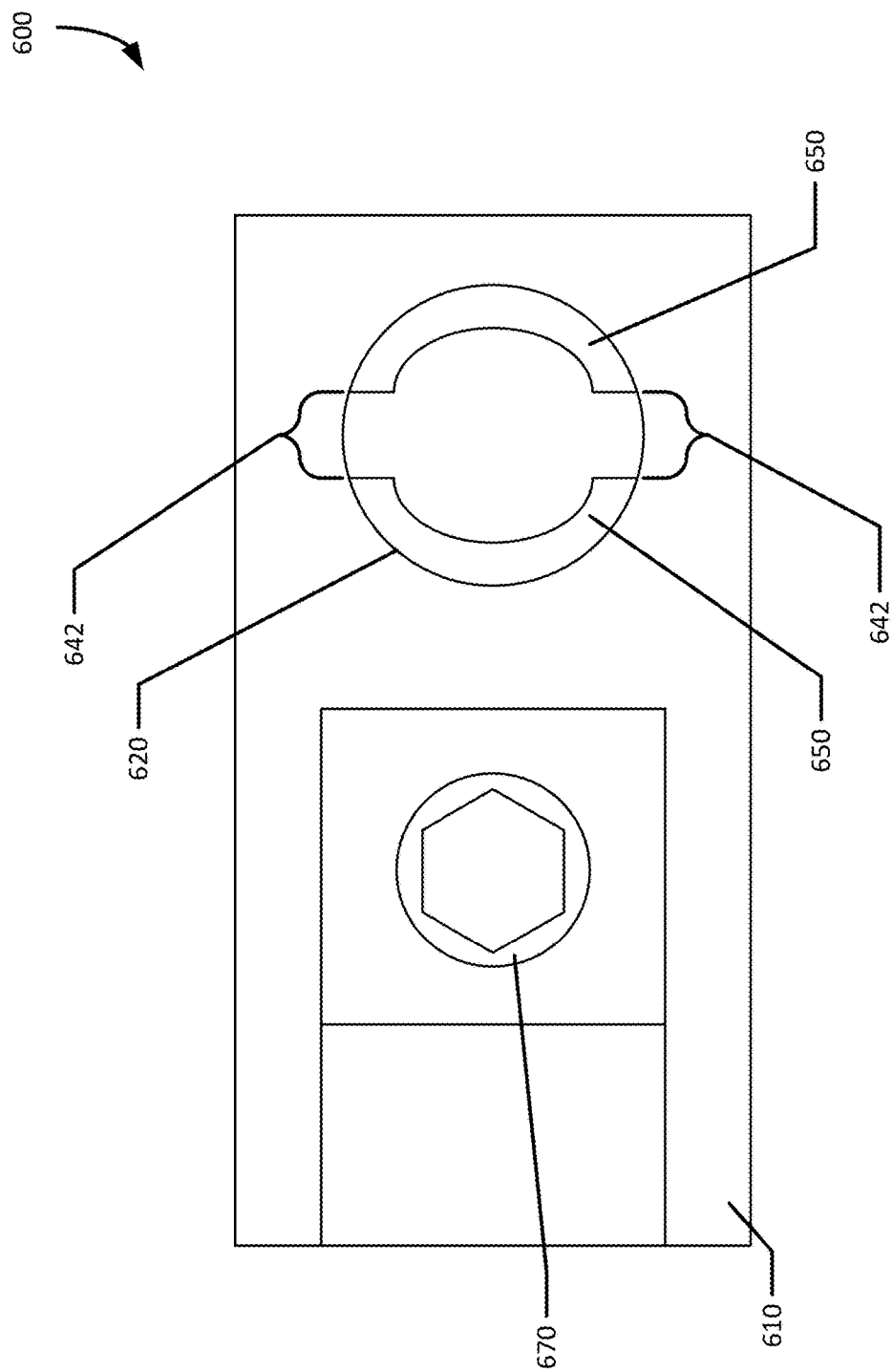
FIG. 5 is an overhead view of the terminal for the circuit breaker showing detail of the installation collar.
Figure 6:
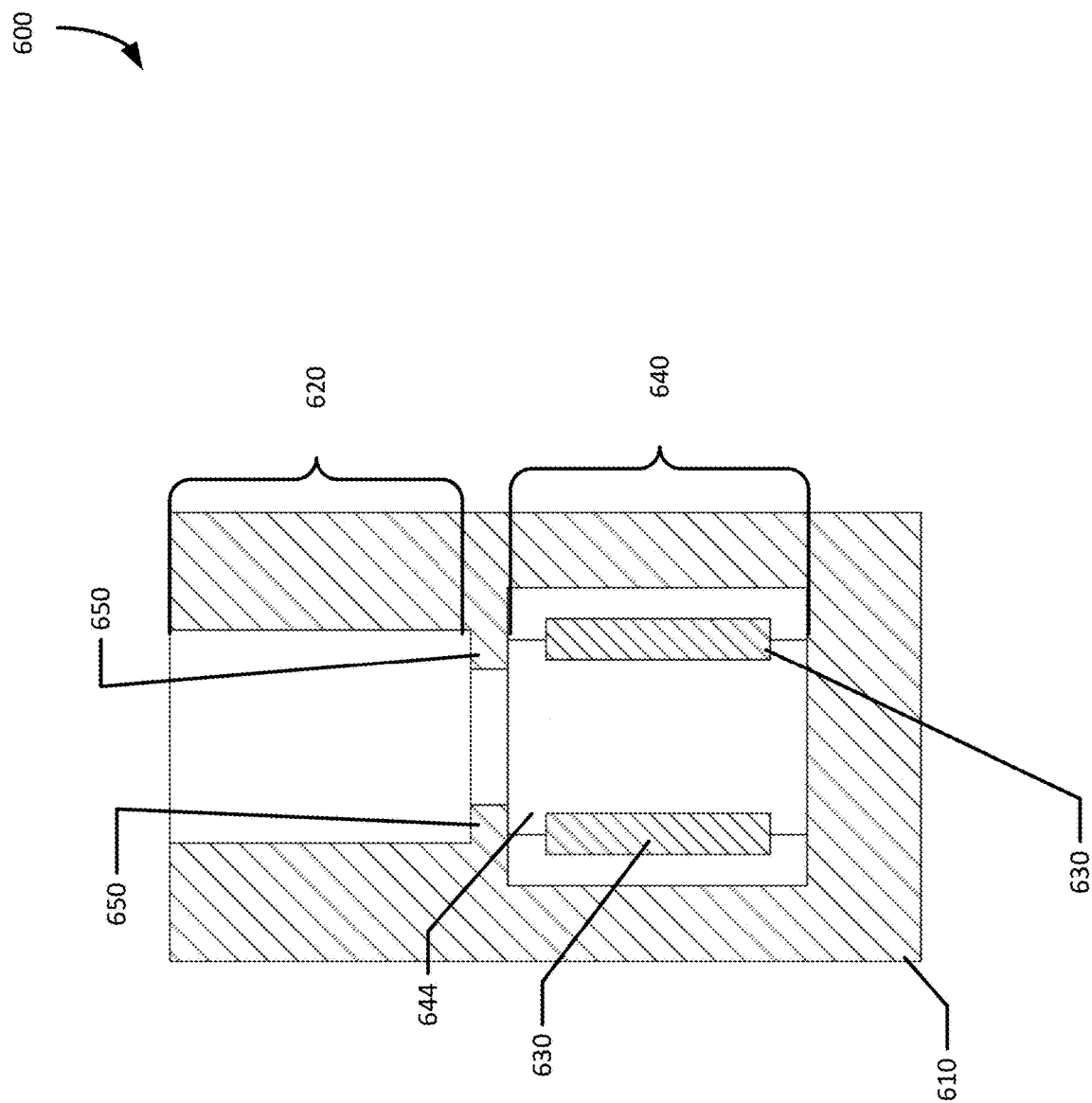
FIG. 6 is a lateral cut-away view of the terminal for the circuit breaker showing the contact blocks as transparencies.
Figure 7:
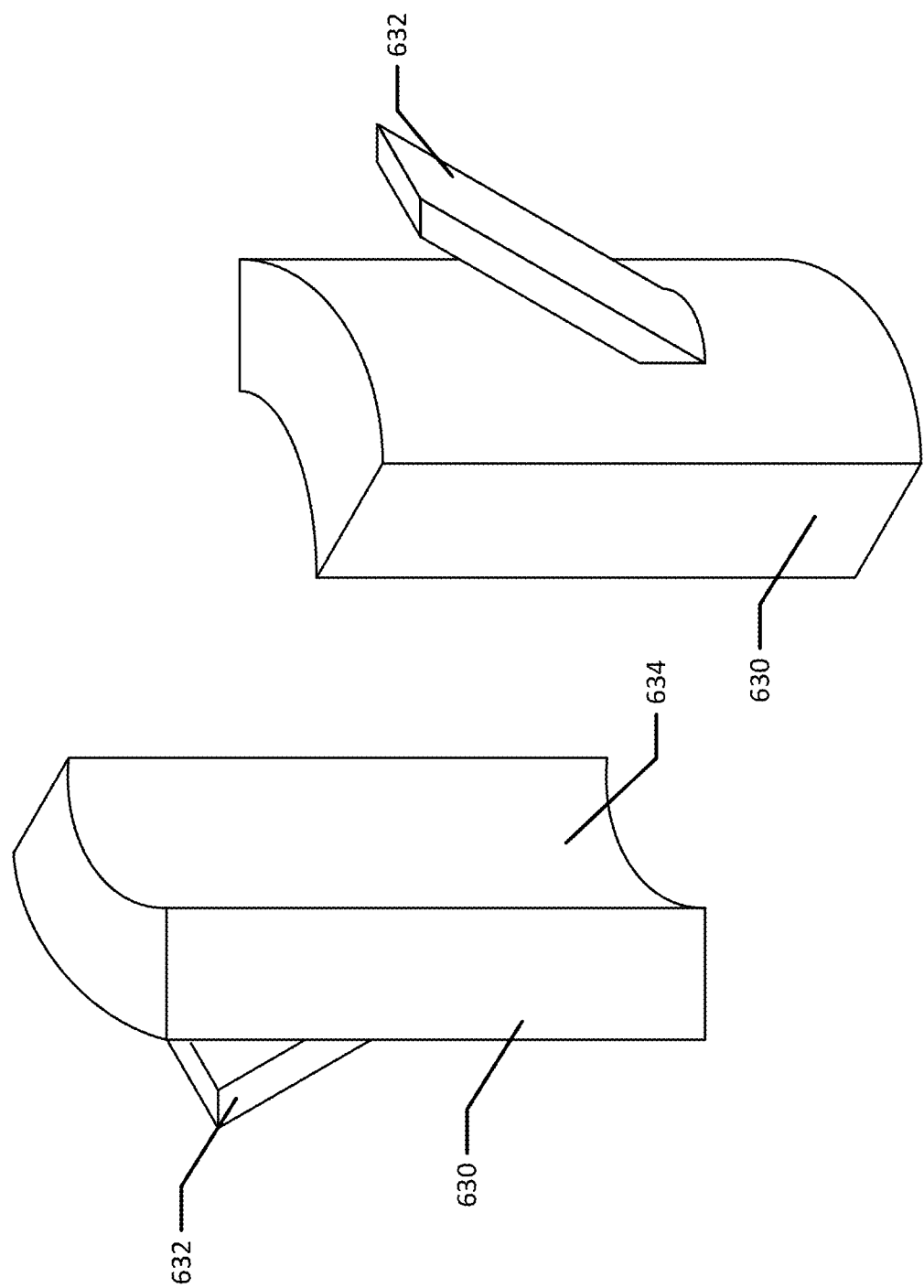
FIG. 7 is an orthographic view of a contact block.

FIGS. 4-7 relate to the terminal 600. FIG. 4 is a cut-away view of the terminal 600 for the circuit breaker system described herein. FIGS. 5 and 6 show alternative views of the terminal 600 that highlight an overhead view of the terminal for the circuit breaker showing detail of the installation collar 650 and a lateral cut-away view of the terminal 600 for the circuit breaker showing the contact blocks 630 as transparencies, respectively. FIG. 7 is an orthographic view of a contact block 630, showing details thereof.

The terminal 600 is operable to physically secure the breaker enclosure 100 and the contact assemblies 500 to the circuit which the breaker will protect and to enable the flow of current through the circuit breaker system when in the closed state to supply power to the load downstream from the circuit breaker system.

The terminal 600 includes a terminal body 610, defining a cowl cavity 620, a contact cavity 640, and a lead cavity 660. The terminal body 610 is comprised of a conductive material, but may include coatings to reduce or increase the surface resistance, increase the wear resistance, or increase the corrosion resistance of various portions of the terminal body 610.

The cowl cavity 620 and contact cavity 640 are collinearly defined in the terminal body 610 and are separated by the installation collar 650. Contact blocks 630 are disposed of within the contact cavity 640 to establish electrical communication between the terminal 600 and the contact assembly 500 via the contact leads 530.

The cowl cavity 620 is defined superficially to the contact cavity 640 and is sized to accept the cowls 200. Although illustrated as having a circular cross sectional area, the cowl cavity 620 may have different shapes for its cross sectional area in different aspects to match differently shaped cowls 200 and thereby act as a poka-yoke or go/no-go safety feature. In various aspects, the surface of the terminal body 610 that defines the cowl cavity 620 may be coated with a non-conductive material to prevent accidental contact being established during installation/extraction of the contact assemblies 500. The cowl cavity 620 may be defined with a greater cross sectional area than the contact cavity 640.

The contact cavity 640 is defined deeper in the terminal body 610 than the cowl cavity 620 and is sized to accept the insertion tabs 550 of the contact assemblies 500, but so that the contact leads 540 do not make electrical contact (or allow a spark to cross the gap to establish contact when the breaker is used according to its rating) with the terminal body 610. Although illustrated with a mostly-circular cross-sectional area with two insertion channels 642 on opposing poles, so long as the contact cavity 640 allows for the rotation of the insertion tabs 550 along with the contact assembly 500 between the conductible state and the insertion state, other cross-sectional shapes are possible. In various aspects, the contact cavity 640 may be coated or treated to increase its electrical resistivity, or improve its wear or corrosion characteristics.

The insertion channels 642 may run the length of the contact cavity 640 and define a space in which the contact block 630 may be installed. Rotation channels 644 may be defined deep to the installation collar 650 to accept the insertion tabs 550 and allow for the rotation of the insertion tabs 550 but to act as a detent 700 to arrest the rotation of the contact assembly 500 beyond the insertion and conductible states. The rotation channels 644 lead from the insertion channels 642 and run along the terminal body 610 defining the contact cavity 640. When the insertion tabs 550 have been rotated into the insertion channels 642 (the contact assembly 500 is fully or partially in the installed state), the insertion channels 642 prevent the removal of the contact assembly 500 from the terminal 600 until the insertion tabs 550 have been rotated out of the rotation channels 644 and into the insertion channels 642 (the contact assembly 500 is in the insertion state). In various aspects, the height in the contact cavity 640 at which the rotation channels 644 are defined may define an additional safety feature that prevents the contact assembly 500 from rotating into the conductible state when the contact assembly 500 (and thereby the insertion tabs 550) are not at the correct depth of insertion for safe installation.

The installation collar 650 separates the contact cavity 640 from the cowl cavity 620. In various aspects, the contact cavity 640 may be defined in the terminal body 610 as a differently sized or shaped cavity from the cowl cavity 620, wherein the installation collar 650 is affixed to a wall defining the cavities or a ledge/rabbet/shoulder leading from a larger superficial cavity to a smaller deeper cavity. Alternatively, the installation collar 650 may be a separate piece inserted and affixed to the terminal body 610 walls or floor deep in the cowl cavity 620 to define the contact cavity 640. The installation collar 650 may be affixed via brazing, welding, tension, etc. or may be an aspect that was milled from the terminal body 610.

In various aspects, the installation collar 650 may define installation gaps 652, aligned with the insertion channels 642 of the contact cavity 640 sized to allow the insertion tabs 550 to enter the insertion channels 642, and may define a through-channel 654, sized to allow the insertion of the contact leads 530 into the contact cavity 640, but prevent the insertion of the insertion tabs 550 of the contact assembly 500 into the contact cavity except through the insertion gaps 652 and insertion channels 642. The installation collar 650 may be coated with or constructed from a non-conductive material or may be conductive in different aspects.

The lead cavity 660 defined in the terminal body 610 accepts electrical leads from the circuit that the circuit breaker system will protect and ensures electrical contact between the terminal 600 and the circuit by pressing the electrical lead into the terminal body 610 with the lead lug 670. In various aspects, the lead lug 670 is a screw having threads mated to the terminal body 610 that a user may tighten or loosen to secure or release the electrical contact. In other aspects, the lead lug 670 is an alligator clip or other spring actuated device to secure the electrical lead in the lead cavity 660. As will be appreciated, the above are given as non-limiting examples, and other devices and connectors may be used to ensure the physical and electrical connection between the circuit and the circuit breaker system. As will also be appreciated, although shown in a perpendicularly tangential arrangement with the other cavities defined in the terminal body 610, in other aspects the lead cavity 660 may be collinear or parallel to the other cavities or may be tangential at an angle other than 90 degrees.

Turning now to FIG. 7, additional details regarding the contact block 630 are discussed. The contact blocks 630 is disposed of in the contact cavity 640 in opposition to one another to make electrical contact with a set of contact leads 530 on an inserted contact assembly 500 that has been rotated into the conductible state. The contact block 630 may be sized to be deep to where the interlock tabs 550 enter the contact cavity 640 so as to not interfere with the insertion of the contact assemblies.

In various aspects, the contact block may be a protrusion from the walls of the terminal body 610 or may be a separate component. In aspects where the contact block 630 is a separate component, it may be mounted to the wall of the terminal body 610 defining the contact cavity 640 or the floor of the contact cavity 640 and may be mounted by affixing (e.g., brazing, welding) the contact block 630 or a surface of the terminal body 610 or attaching the contact block 630 to a compression spring affixed to a surface of the terminal body 610 to push the contact block 630 into contact with the contact leads 530. In various aspects, the contact block 630 may be connected to a spring via a prong 632 facing the surface to which the spring is affixed, or may use the prong 632 itself as a simple spring.

The contact block 630 includes a contact surface 634 that makes electrical contact with the contact leads 530. In various aspects, the contact surface 634 (or the entire contact block 630) is treated to improve its conductivity, wear resistance, or corrosion resistance. In one example, the contact surface 624 may act as a detent 700 that the contact leads 530 will make contact with and restrict the further rotation of the contact assembly 500 via a stop (e.g., via an "L" shaped contact surface 624). In another example, the contact surface 624 may define an arced surface that the contact leads 530 may rotate across to make electrical contact, wherein the contact leads 530 include a similarly arced surface to mate with the contact surface 624 as at least a portion of a concentric arc to that defined by the contact surface 624.

Figure 8:
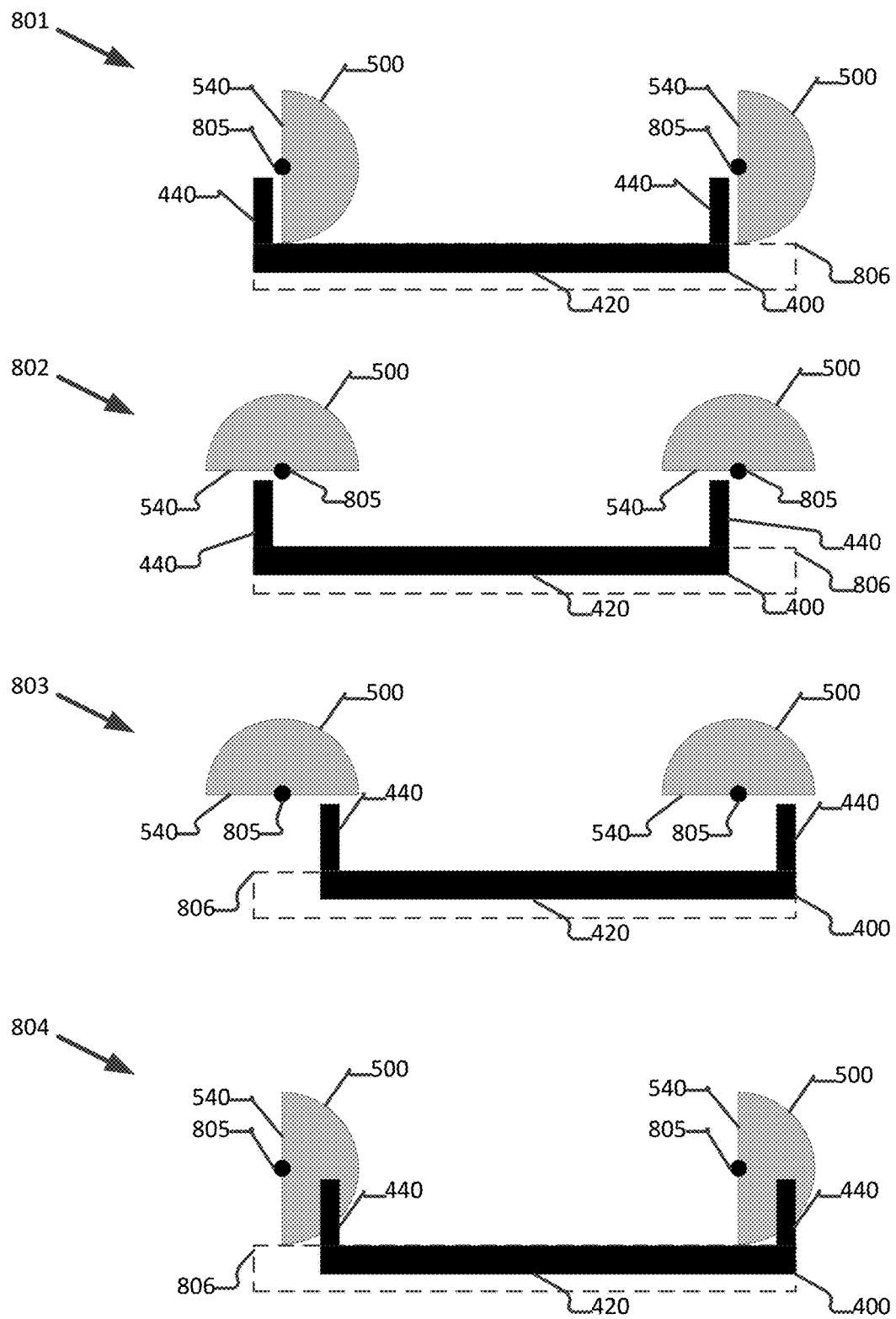
FIG. 8 illustrates a series of different breaker states.

FIG. 8 illustrates a series of different breaker states 801-4 based on the states for the trip unit 200 and resultant position of the interlock toggle 400 and the states of the contact assemblies 500 in relation to one another. As illustrated, the contact assemblies 500 are cut away to provide a top-down (or bottom-up) view showing the interactions between the interlock tabs 540 and the interlock toggle 400. Also illustrated is the rotational axis 805 of the contact assemblies and the travel path 806 of the interlock toggle 400, which are not physical components, but are provided as an aid in describing the breaker states 801-4.

As mentioned above, the contact assemblies 500 rotate between an insertion state (allowing the breaker assembly 100 to be installed or removed from the terminals) and an conductible state (allowing the contact assemblies 500 to carry current from the terminals 160), but if one contact assembly 500 is in the conductible state, the breaker is considered to be in the conductible state and any state between the full insertion state and the fill conductible state may be treated as the conductible state. As illustrated, the contact assemblies rotate a quarter turn (e.g., 90 degrees of arc) between each state, but other rotational travel distances are possible in different aspects.

Similarly, the state of the trip unit 200 is reflected in the position of the interlock toggle 400, thus the state of open or closed for the trip unit 200 may be described in terms of the toggle interlock 400 sharing that state. Although several positions are possible for the toggle interlock 400 (e.g., when moving from one state to another, a different position for trip-open versus manual-open), any position that is not related to the closed state may be treated as part of the open state.

A first breaker state 801 corresponds to when the contact assemblies 500 are in the insertion state and the trip unit 200 is in the open state. When the trip unit 200 is in the open state, it cannot carry current, and it is safe to insert the breaker enclosure 100 into the terminals 600. To prevent the trip unit 200 from entering the closed state, the contact assemblies 500 in the insertion state prevent the toggle interlock from moving along its travel path 806 to the closed state.

A second breaker state 802 corresponds to when the contact assemblies 500 are in the conductible state and the trip unit 200 is in the open state. When the contact assemblies 500 are in the conductible state, the contact assemblies 500 cannot be inserted into or removed from the terminals 600 due to the insertion tabs 550 interfering with the installation collar 650.

A third breaker state 803 corresponds to when the contact assemblies 500 are in the installation state and the trip unit 200 is in the closed state. Because when the contact assemblies are in the conductible state the interlock tab 540 is rotated to allow the free movement of the interlock toggle 400, the circuit breaker may freely switch from second breaker state 802 to the third breaker state 803 and vice versa, allowing a user or the trip unit 200 to change the state of the circuit breaker.

A fourth breaker state 804 is illustrated, but shows an impossible state for the breaker given its construction. The hypothetical fourth breaker state 804 corresponds to when the contact assemblies 500 are in the insertion state and the trip unit 200 is in the closed state. As shown, the arms 440 of the interlock toggle 400 would interfere with the contact assemblies 500, thus preventing the circuit breaker from being in the fourth breaker state 804. Instead, when the trip unit 200 moves from the open state to the closed state and the contact assemblies 500 are in the insertion state, the interlock toggle 400 would either be prevented from moving to the closed state (keeping the trip unit 200 in the open state and the first breaker state 801) or would move the contact assemblies 500 to the installed state and the third breaker state 803 (preventing the breaker enclosure 100 from being inserted to or removed from the terminals 600). Alternatively, when the trip unit 200 starts in the closed state, by rotating one or more contact assemblies 500 from the conductible state to the insertion state, the interlock tab 540 would interface with the arms 440 of the interlock toggle 400 to move the interlock toggle 400 (and thus the trip unit 200) into the open state and the breaker into the first breaker state 801 or would be prevented from rotating, and would remain in the third breaker state 803. As will be appreciated, the interlock tab 540 and/or the arms 440 may include bevels, catches or other devices intended to improve the interface between the two sub-components or to reduce the durability of the components.

Figure 9:
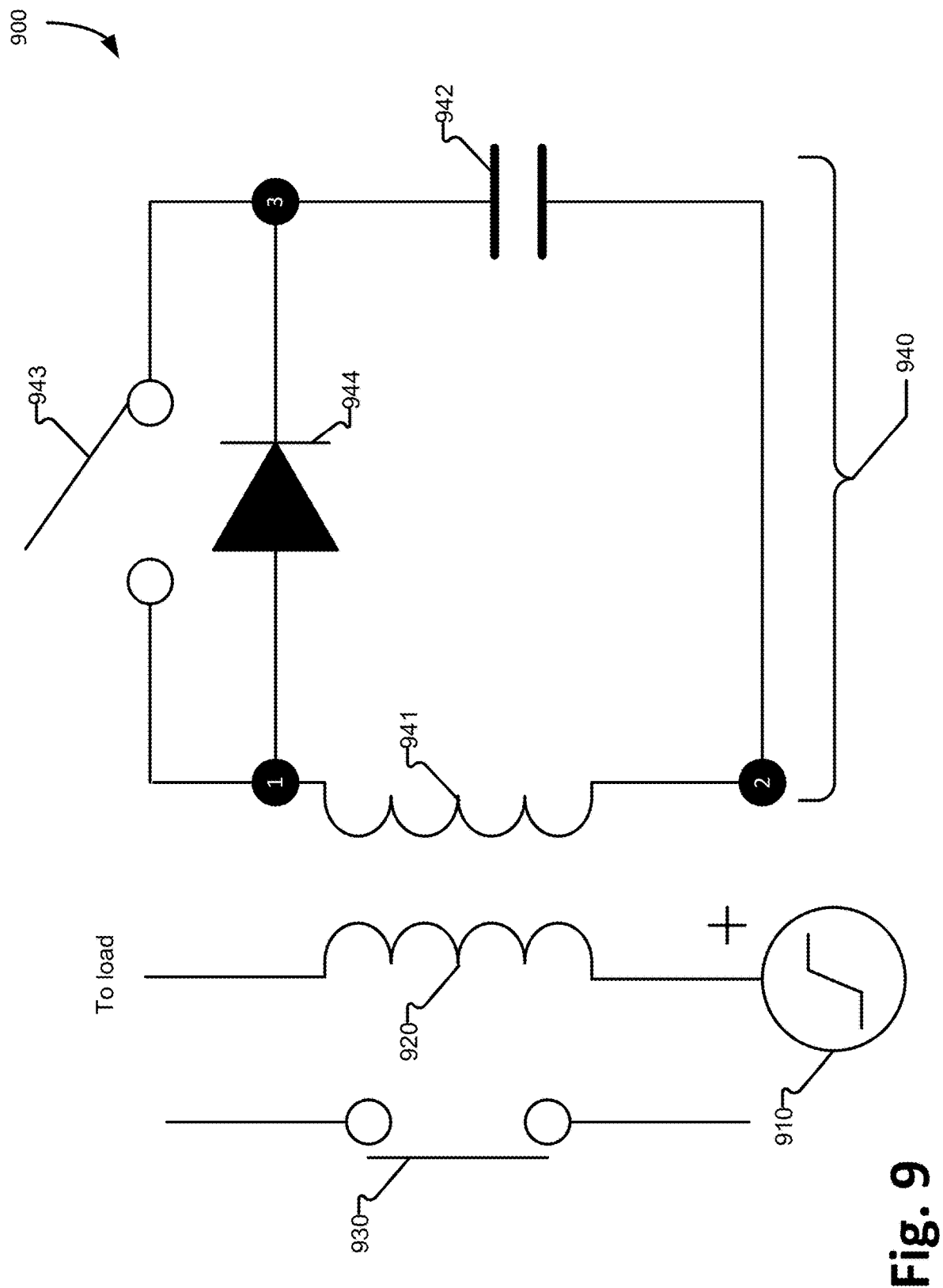
FIG. 9 illustrates an additional safety circuit for use in a trip unit.

FIG. 9 illustrates an additional safety circuit for use in a trip unit 200 to incorporate an electric interlock circuit 900 so that the trip unit 200 may be moved automatically from the closed state to the open state when a permanent magnet (or mechanical relay) associated with a locking pin used to secure the trip unit 200 in the breaker enclosure 100, the interlock toggle 400, or one or more contact assemblies 500 moves across a reed switch 943 (or a solid-state switch) to simulate a short circuit. In the illustrated interlock circuit 900, the power source 910 (e.g., supplying the line current) is illustrated in electrical communication with the short-circuit winding 920 of the trip unit 200, but as will be appreciated, may be omitted or presented without electrical communication when the trip unit 200 is in the open state or is not installed in the circuit between the line and the load.

The short-circuit winding 920 is an electromagnetic coil that is operable to move, via electromagnetic forces, a short-circuit switch 930 when the trip unit 200 detects a short circuit. The short-circuit switch 930 may be either pulled or pushed by the short-circuit winding 920 or make or break contact when sufficient current flows through the short-circuit winding 920 (producing a sufficiently strong magnetic field), which the trip unit 200 will interpret to mean that a short circuit has occurred in the load or the electrical protection device and thereby open the contacts, moving the trip unit 200 to the open state.

The short-circuit winding 920 is in electromagnetic communication with the energy storage circuit 940 via an inductive winding 941 that is affected by the magnetic field produced by the short-circuit winding 920 to induce a current in the energy storage circuit 940 when the short-circuit winding 920 carries current from the power source 910. When a current is induced in the energy storage circuit 940, energy is stored in a capacitor 942 to allow for the current normally present in the trip unit 200 during operation to charge the energy storage circuit 940. A diode 944 is disposed of between the inductive winding 941 and the capacitor 942, and is biased to allow the flow of current from the inductive winding 941 to the capacitor 942. The reed switch 943 is disposed of in parallel to the diode 944 and is open while the energy storage circuit 940 is charging (or is charged), and when the reed switch 943 is in the closed state, the capacitor 942 discharges and energizes the inductive winding 941. The energy stored in the capacitor 942 is fed back through the inductive winding 941 when the reed switch 943 is closed to produce a magnetic field that activates the short-circuit switch 930, causing the trip unit 200 to move to the open state.

Figure 10:
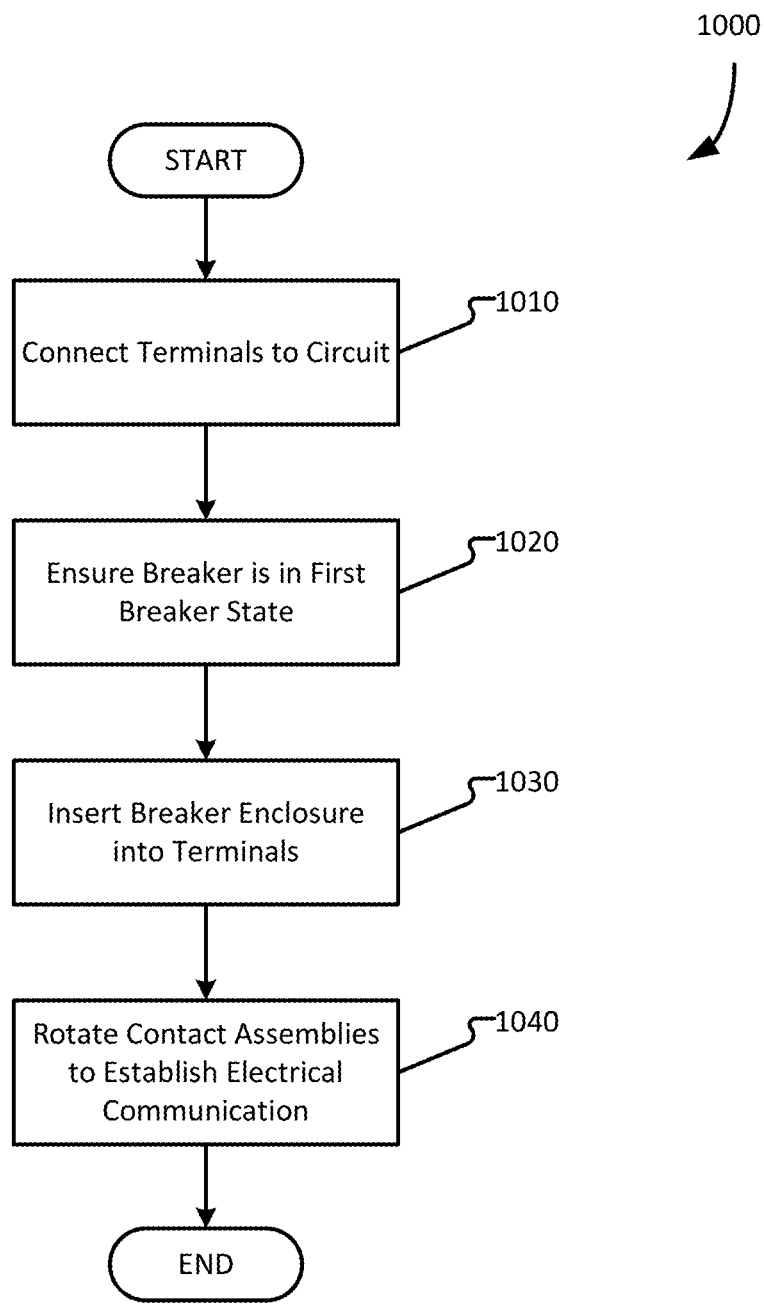
FIG. 10 is a flow chart showing the general stages in an example method to install the improved circuit breaker described herein.

FIG. 10 is a flow chart showing the general stages in an example method 1000 to install the improved circuit breaker system described herein. As will be appreciated, the operations of method 1000 may be executed in reverse to uninstall the circuit breaker system from the circuit and may omit OPERATION 1010 when the terminals 600 are already installed or are to remain installed.

When installing a circuit breaker system, method 1000 begins at OPERATION 1010, where the terminals 600 are connected to the circuit. An operator may strip conductive leads from the circuit and insert them into the lead cavities 660 of the terminals 600 and ensure the solid contact between the terminal 600 and the circuit by clamping the circuit's lead to the terminal 600 via a terminal lug 670. In various aspects, the terminals 600 are connected to a surface, such as, for example, in a breaker box, and are spaced apart from one another to allow the breaker enclosure 100 to be connected to the terminals 600. As will be appreciated, for each phase that the circuit breaker system will protect in the circuit, a pair of terminals 600 will be connected to the circuit; one upstream to the breaker enclosure 110 and one downstream, such that a single phase breaker will use one pair of terminals 600 and a three-phase breaker will employ six terminals 600 in pairs of two. Similarly, for each phase protected by the circuit breaker system, one pair of contact assemblies 500 (one in communication on the anode/upstream side of the trip unit 200 and the other in communication on the cathode/downstream side of the trip unit 200) will be used to mate with the associated terminals 600.

At OPERATION 1020 the circuit breaker is ensured to be in the first breaker state 801, where the trip unit 200 is in an open state and all of the contact assemblies 500 are in the insertion state. In the first breaker state 801 the trip unit 200 will holds the electrical contacts of the circuit breaker apart so that they are not in electrical communication with one another and the contact assemblies 500 are rotated so that they may pass the interlock collar 650 and not hold the contact leads 530 in electrical communication with the contact blocks 630. The circuit breaker may be safety inserted or removed from the terminals when in the first breaker state 801, even when the circuit is under load.

Proceeding to OPERATION 1030, the breaker enclosure 110 is inserted into the terminals and the contact assemblies are rotated into the installed state from the insertion state at OPERATION 1040 to make an electrical connection between the contacts leads 530 and the contact blocks 630. This corresponds to the second breaker state 802. The trip unit 200 may then be safely moved to the closed state, establishing electrical communication for the circuit through the circuit breaker and corresponding to the third breaker state 803. As will be appreciated, the state of the circuit breaker once installed may vary between the second breaker state 802 and third breaker state 803 during the course of normal, and a user may return the circuit breaker to the first breaker state 801 to remove the breaker enclosure 110 from the terminals 600. Method 1000 may then conclude.

In accordance with further aspects, the disclosed circuit breaker system may be employed as part of a sensing system in which sensors are included to detect various states of the circuit breaker system. Further, such detected states may be sent to a remote monitoring system by a transmitter configured to communicate with the remote monitoring system by any suitable wired or wireless communication arrangement. Moreover, a plurality of the circuit breaker systems may communicate with such a monitoring system via a network architecture, allowing central monitoring of the sensors associated with respective circuit breaker systems. For example, various sensors may be configured to detect current flow between the terminals 600, voltage differences between the terminals 600, whether the trip unit 200 is in the open or closed state, whether the breaker enclosure 100 is installed into the terminals 600, etc.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. An electrical protection system operable to be safely installed and removed with equipment under load, comprising:
   a protection device enclosure including:
      a trip unit, operable to move the electrical protection system between an open state to a closed state;
      a toggle interlock, in physical communication with the trip unit and operable to move laterally in response to the electrical protection system moving between the open state and the closed state;
      a first contact assembly in electrical communication with the trip unit on an anode side of the trip unit and protruding from the protection device enclosure;
      a second contact assembly in electrical communication with the trip unit on a cathode side of the trip unit and protruding from the protection device enclosure;
   wherein the first contact assembly and second contact assembly are operable to rotate between an insertion state and a conductible state;
   wherein the first contact assembly and second contact assembly each define interlock tabs as depressions along the length of the contact assembly, the interlock tabs allowing the toggle interlock to move freely when all contact assemblies are in the conductible state and mechanically preventing the trip unit from being in the closed state via the toggle interlock when at least one of the contact assemblies is in the insertion state;
   a first terminal, in electrical communication with the first contact assembly and an upstream portion of a circuit which the electrical protection system is to protect;
   a second terminal, in electrical communication with the second contact assembly and a downstream portion of the circuit which the electrical protection system is to protect;
   wherein the first terminal and the second terminal each include installation collars, the installation collars preventing insertion or removal of an associated contact assembly in the conductible state; and
   wherein the first terminal and the second terminal each include contact blocks, the contact blocks establishing electrical communication between the circuit and the associated contact assembly when the associated contact assembly is in the conductible state.

2. The electrical protection system of claim 1, wherein the protection device enclosure further includes:
   a first cowl, through which the first contact assembly protrudes;
   a second cowl, through with the second contact assembly protrudes;
   a first cowl cavity defined in the first terminal superficial to the contact collar, shaped to accept the first cowl and into which the first cowl extends;
   a second cowl cavity defined in the second terminal superficial to the contact collar, shaped to accept the second cowl and into which the second cowl extends; and
   wherein the first cowl and the second cowl are constructed of a non-conductive material.

3. The electrical protection system of claim 2, wherein the first cowl and the second cowl are partially retracted into the protection device enclosure when the first cowl and the second cowl are accepted into the first cowl cavity and the second cowl cavity.

4. The electrical protection system of claim 1, wherein the first contact assembly and second contact assembly each define non-conductive insertion tabs extending perpendicularly from a shaft of the associated contact assembly, wherein the insertion tabs are cooperatively sized and shaped with an insertion channel defined in an associated terminal and its installation collar for allowing insertion or removal of the associated contact assembly while in the insertion state.

5. The electrical protection system of claim 4, wherein the first terminal defines a cowl cavity superficial to the contact collar and defines a contact cavity deep to the contact collar in the first terminal, wherein the contact cavity defines a rotation channel sized to allow free rotation of the insertion tabs and thereby the associated contact assembly between the insertion state and the conductible state.

6. The electrical protection system of claim 1, wherein the protection device enclosure further includes:
   a first detent in communication with the first contact assembly, operable to prevent the first contact assembly from over rotating between the insertion state and the conductible state; and
   a second detent in communication with the second contact assembly, operable to prevent the second contact assembly from over rotating between the insertion state and the conductible state.

7. The electrical protection system of claim 6, wherein the first detent prevents the first contact assembly from over rotating between the insertion state and the conductible state by making contact with the protection device enclosure or the trip unit when the first contact assembly is in the insertion state or the conductible state, and wherein the second detent prevents the second contact assembly from over rotating between the insertion state and the conductible state by making contact with the protection device enclosure or the trip unit when the first contact assembly is in the insertion state or the conductible state.

8. The electrical protection system of claim 6, wherein the first detent and the second detent are defined on the contact blocks, wherein the contact blocks prevent the over rotation of the first contact assembly and the second contact assembly by providing a stop to engage contact leads of the first contact assembly and the second contact assembly.

9. The electrical protection system of claim 6, wherein the first detent is a rotation channel defined in the first terminal cooperatively sized and positioned to prevent over rotation of the first contact assembly via installation tabs extending perpendicularly from a shaft of the first contact assembly, and wherein the second detent is a rotation channel defined in the second terminal cooperatively sized and positioned to prevent over rotation of the second contact assembly via installation tabs extending perpendicularly from a shaft of the second contact assembly.

10. The electrical protection system of claim 1, wherein the installation collar is non-conductive.

11. The electrical protection system of claim 1, wherein the contact blocks define arced contact surfaces, operable to engage and establish electrical communication with arced contact leads extending perpendicularly from the first contact assembly and the second contact assembly when in the conductible state.

12. A method for assembling an electrical protection system, the electrical protection system including a first contact and a second contact rotatable between first and second rotational states, the first contact and second contact electrically connecting to corresponding terminals when in the second rotational state and not electrically connecting to the corresponding terminals when in the first rotational state, and a trip unit for opening and closing an electrical connection between the first contact and the second contact, the method comprising:
- mechanically preventing the first contact and the second contact from being loaded into the electrical protection system unless the trip unit is open and the first contact and the second contact are in the first rotational state;
- inserting the first contact and the second contact into the electrical protection system while the trip unit is open and the first contact and the second contact are in the first rotational state;
- mechanically preventing the trip unit from being closed while the first contact and the second contact are inserted and are in the first rotational state;
- rotating the inserted first contact and the second contact from the first rotational state to the second rotational state;
- closing the trip unit while the inserted first contact and the second contact are in the second rotational state;
- mechanically preventing the inserted first contact and the second contact from being moved from the second rotational state to the first rotational state while the trip unit is closed; and
- mechanically preventing the inserted first contact and the second contact from being removed from the electrical protection system while in the second rotational state.

13. The method of claim 12, wherein rotating the inserted first contact or the second contact from the second rotational state to the first rotational state mechanically opens the trip unit.

14. An electrical protection device operable to be safely installed and removed with equipment under load, comprising:
- an enclosure, made of a non-conductive material, having an enclosure body, a cover, and cowls;
- contact assemblies, extending vertically through the enclosure through the cowls, each contact assembly having:
  - a shaft having a top and a bottom about which the contact assembly rotates between an insertion state and a conductible state;
  - a knob on the top of the shaft, positioned outside of the enclosure;
  - contact leads extending perpendicularly from the shaft, located proximate to the bottom of the shaft;
  - installation tabs extending perpendicularly from the shaft, located topward from the contact leads and at right angles from the contact leads; and
  - an interlock tab, defined as a depression on the shaft bottomward from the knob and topward from the installation tabs;
- a trip unit, located centrally to the contact assemblies within the enclosure, in electrical communication with the contact assemblies, operable to carry current from an anode to a cathode when in a closed state and to not carry current when in an open state;
- a toggle interlock, in communication with the trip unit, operable to move horizontally within the enclosure to a first position when the trip unit is in the closed state and to move to a second position when the trip unit is in the open state; and
- wherein the toggle interlock is positioned vertically in the enclosure relative to interlock tabs of the contact assemblies such that the first position coincides with the installation tab of at least one contact assembly so that when the at least one contact assembly is in the conductible state, the installation tab of the at least one contact assembly prevents the trip unit from being in the closed state by blocking the toggle interlock from moving to the first position.

15. The electrical protection device of claim 14, further comprising an actuator lever, positioned outside of the enclosure and in communication with the trip unit, operable to move the trip unit between the closed state and the open state.

16. The electrical protection device of claim 14, wherein the installation tabs are non-conductive.

17. The electrical protection device of claim 14, wherein the contact leads define arced contact surfaces.

18. The electrical protection device of claim 14, wherein when a given contact assembly is rotated to the insertion state and the interlock tab is in the first position, the interlock tab is moved to the second position and the trip unit is changed to the open state.

19. The electrical protection device of claim 14, wherein when a given contact assembly is in the insertion state, the trip unit is prevented from entering the closed state by the toggle interlock being blocked from moving to the first position by the interlock tab of the given contact assembly.

20. The electrical protection device of claim 14, wherein the installation tabs extend further from the shaft than the contact leads extend from the shaft.

21. The electrical protection device of claim 14, wherein the electrical protection device acts as one of:
- a circuit breaker;
- a switch;
- a contactor;
- a fuse block; or
- a starter.

22. The electrical protection device of claim 14, wherein the trip unit includes an energy storage circuit in magnetic communication with a short-circuit winding of the trip unit, the energy storage circuit comprising:
- an inductive winding, in magnetic communication with the short-circuit winding, and in electrical communication with a first node and a second node of the energy storage circuit;
- a capacitor, in electrical communication with the second node and a third node of the energy storage circuit;
- a switch, in electrical communication with the first node and the third node when in a closed state; and
- a diode, in electrical communication with the first node and the third node, biased for current flow from the first node to the third node;
- wherein the short-circuit winding induces a current in the inductive winding when the switch is open to provide a charge to the capacitor; and
- wherein the capacitor discharges the charge when the switch is closed to induce additional flux in the short-circuit winding via the inductive winding.

23. The electrical protection device of claim 22, wherein the switch is operable to be closed in response to a lock pin of the trip unit being unlocked.

24. The electrical protection device of claim 23, wherein the switch is in magnetic communication with a permanent magnet associated with the lock pin to close in response to the lock pin being unlocked.

25. The electrical protection device of claim 23, wherein the switch is in mechanical communication with the lock pin to close in response to the lock pin being unlocked.

26. The electrical protection device of claim 22, wherein the switch is a reed switch or a solid-state switch.

27. The electrical protection device of claim 14, further comprising:
- a sensor configured to detect a state of the electrical protection device; and
- a transmitter configured to send the detected state to a remote monitoring system.

\* \* \* \* \*